United States Patent Office 3,345,491
Patented Oct. 3, 1967

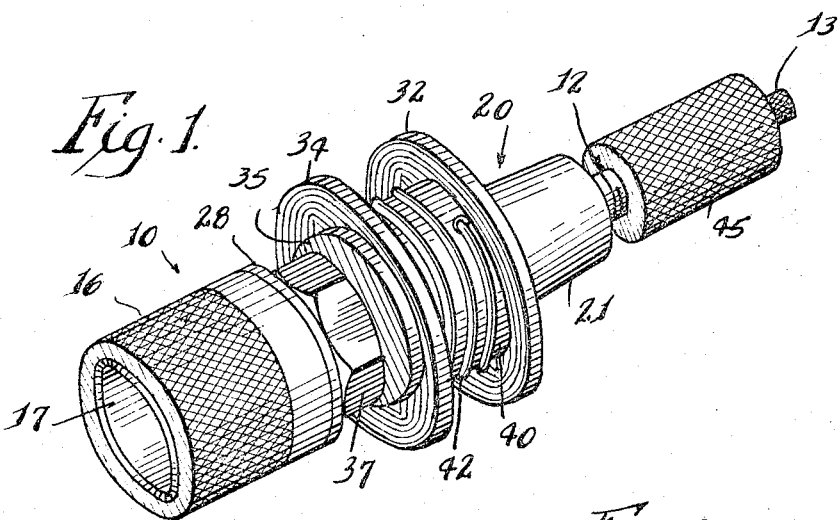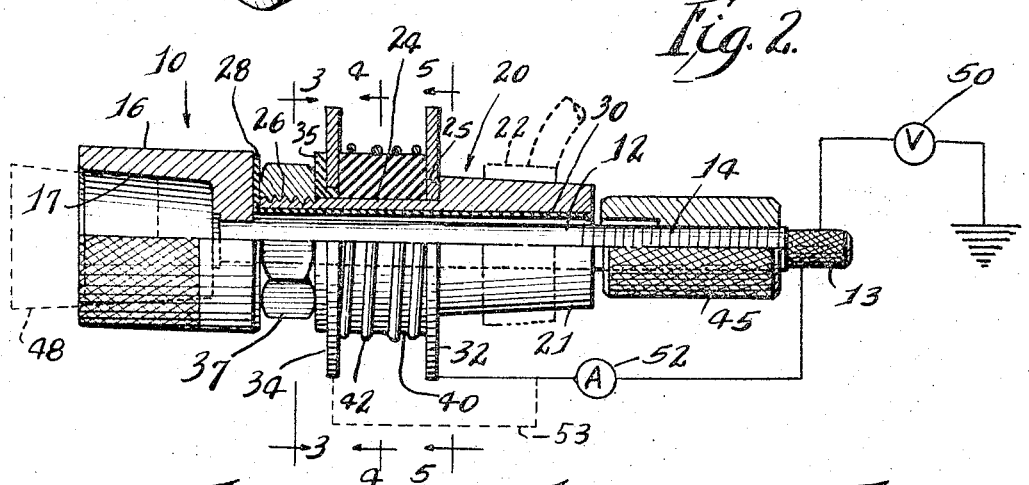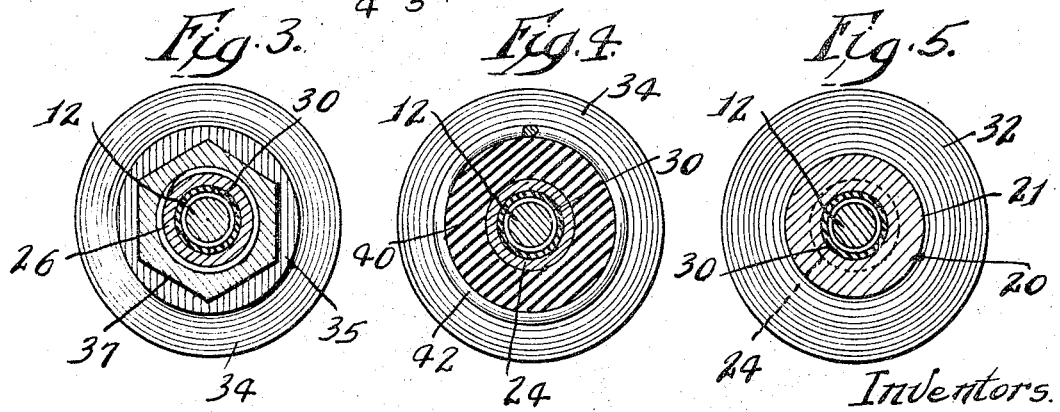

3,345,491
BATTERY TESTING ADAPTER
Robert E. Badger, Twin Lakes, and Jack L. Boone, Kenosha, Wis. (both of 8028 28th Ave., Kenosha, Wis. 53140)
Filed Nov. 9, 1962, Ser. No. 236,652
6 Claims. (Cl. 200—162)

This invention relates to a battery testing adapter, and more particularly to an adapter designed for making electrical tests on an in-place automobile battery and associated generating and regulating system.

In many present day automobiles the voltage regulators are sealed units which do not have exterior terminals, as formerly, that may be disconnected to accommodate testing instruments. The adapter of this invention compensates for this change in voltage regulator construction, and enables the desired tests to be performed conveniently at the battery itself, which in all automobiles is readily accessible.

One object of the invention, therefore, is to provide an adapter that facilitates testing the voltage and current characteristics of an automobile battery and associated generating and regulating system.

Another object is to provide a testing adapter engageable by friction with a battery terminal from which the cable clamp first has been removed. The cable clamp, in turn, is connected to the adapter to condition the assembly for making the desired tests.

Another object is to provide such an adapter wherein the component parts are substantially in-line with each other, and, when the adapter is mounted on a battery terminal, are co-linear with the terminal, whereby strain on the terminal is minimized. To this end the adapter includes a resistance element of appropriate value.

Another object is to provide a battery testing adapter that is capable of simulating a fully-charged battery for the purpose of checking the settings of an associated voltage regulator.

Still another object is to provide a battery testing adapter having an arrangement to increase current carrying capacity so that the automobile starting motor may be energized with the adapter in place. This arrangement provides a shunt for the relatively high starting current, and eliminates the possibility of damage by such current to equipment used in making the tests.

Other objects, advantages and details of the invention will be apparent as the description proceeds, reference being had to the accompanying drawing wherein a preferred form of the invention is shown. It is to be understood that the description and drawing are illustrative only, and that the scope of the invention is to be measured by the appended claims.

In the drawing:

FIG. 1 is a perspective view of a battery testing adapter embodying the invention.

FIG. 2 is a view, partly in elevation and partly in longitudinal section, of the adapter. Typical testing circuits are shown schematically in the figure.

FIG. 3 is a sectional view on line 3—3 of FIG. 2.

FIG. 4 is a sectional view on line 4—4 of FIG. 2.

FIG. 5 is a sectional view on line 5—5 of FIG. 2.

Referring now to the drawing, a battery testing adapter embodying the invention is designated by the numeral 10 in FIGS. 1 and 2.

Adapter 10 includes an elongated conducting stem 12 that extends substantially from one end of the adapter to the other. As illustrated, the extreme right-hand end portion 13 of stem 12 may be reduced in diameter and provided with a knurled exterior. This portion constitutes one terminal of the adapter. Length 14 (FIG. 2) of stem 12 inwardly of end portion 13 is provided with threads for a purpose to be described later.

Adapter 10 also includes means for connecting stem 12 electrically to a battery terminal (not shown). In the form of the invention illustrated, this connecting means is a conducting base portion 16 secured to the end of stem 12 opposite end portion 13. Base portion 16 has a tapered axial bore 17 adapted to receive and make electrical and frictional mechanical contact with a battery terminal from which the associated cable clamp has been removed. For convenience in handling, the exterior of base portion 16 may be knurled.

An elongated conducting sleeve member 20, sometimes called a conducting connecting means, is positioned on stem 12 in a position generally toward base portion 16. Right-hand end portion 21 of sleeve member 20 is tapered to facilitate connection thereto of a battery cable clamp 22, shown in broken line. Untapered portion 24 of sleeve member 20 is reduced in diameter, providing a shoulder 25. Left-hand end portion 26 of sleeve member 20 is threaded, as shown in FIG. 2.

A first insulating washer 28 is located between base portion 16 and the adjacent end of sleeve member 20, insulating the latter electrically from the former.

Means also are provided for insulating sleeve member 20 in its entirety from stem 12. As shown, this means is a tube 30 of insulating material located in the annular space between stem 12 and sleeve member 20.

Referring now to reduced-diameter portion 24 of sleeve member 20, this portion carries two spaced terminal elements that during use of the adapter are connected in testing circuits. As shown, these terminal elements may comprise conducting washers having surface discontinuities, such as circular ridges and recesses, that cooperate to provide secure, positive connection with the spring clips (not shown) of associated testing apparatus.

First conducting washer 32 is mounted on reduced portion 24 of sleeve 20 in mechanical and electrical engagement with shoulder 25. Second conducting washer 34 is mounted on reduced portion 24, but this washer is insulated electrically from portion 24. As shown, an insulating washer 35, L-shaped in cross section, cooperates to insulate conducting washer 34 both from portion 24 and from nut 37 on threaded end portion 26 of portion 24. As shown in FIG. 2, nut 37 is located between first insulating washer 28 and last-mentioned insulating washer 35.

Conducting washers 32 and 34 are held in spaced-apart relation and insulated from each other by suitable means such as insulating spacer 40. Nut 37, of course, holds together the assembly comprising conducting washers 32 and 34, insulating washer 35 and spacer 40.

Resistance means 42, shown as a spirally wound length of resistance wire, surrounds spacer 40 and is connected between conducting washers 32 and 34. A practical example of the resistance of means 42 is ¼ ohm. This ohmic value presently is recommended by battery manufacturers and manufacturers of voltage regulators and charging equipment as the proper series resistance to simulate that of a fully-charged automobile battery.

Means is provided for electrically connecting and disconnecting sleeve member 20 with respect to stem 12. In the form of the invention shown, this means comprises elongated knurled nut 45 positioned on threaded length 14 of stem 12. As is apparent, nut 45 may be turned into and out of engagement with the adjacent end face of sleeve member 20, thereby functioning as an on-off switch means between stem 12 and sleeve member 20.

In using adapter 10 for making conventional tests of a battery and associated generator and regulator system in an automobile, the cable clamp first is removed from the appropriate battery terminal 48, shown in broken line in FIG. 2. Adapter 10 is connected to the terminal by telescoping end portion 16 over the terminal. The tapered interior 17 of end portion 16 provides suitable mechanical and electrical connection.

It will be noted that the various parts of adapter 10 are substantially in-line with each other and with the axis of the battery terminal. This construction minimizes twisting and lateral stresses on the terminal, thereby avoiding damage to the internal connection between the battery plates and the terminal.

The disconnected cable clamp 22 normally connected to the battery terminal 48 is applied to tapered portion 21 of sleeve 20, as shown in broken line in FIG. 2. For most tests, nut 45 is turned out of engagement with sleeve 20, as also shown in FIG. 2.

A battery voltage test without load is made by connecting a voltmeter 50 between stem end portion 13 and ground, as shown in FIG. 2.

An ammeter 52 is placed in series with the battery terminal and battery cable by connecting same between stem end portion 13 and conducting washer 32, as also shown in FIG. 2. Ammeter 52 will measure the current flowing in the battery circuit.

To simulate a fully charged battery for checking the voltage regulator settings, ammeter 52 is disconnected from washer 32 and connected between stem end 13 and conducting washer 34, as shown by broken line 53. In this circuit the resistance of means 42 appears in series with the battery.

Nut 45 is brought into engagement with sleeve 20 when it is desired to start the automobile motor. The connection thus made between stem end 13 and sleeve 20 provides a high capacity path from the battery to cable clamp 22 for the current required by the starter motor. Absent this connection, the heavy starter current would traverse ammeter 52, and likely damage same.

The adapter of the invention also provides a voltage test of the battery during operation of the starter motor. At such time the current flow is in the range of 150 to 200 amperes. For this test nut 45 is brought into engagement with sleeve 20, and the starter motor is energized by closing the starter switch. The voltage under this load condition appears on voltmeter 50 (connected between stem end 13 and ground), and gives indication of the charge state of the battery.

From the above description it is thought that the construction and advantages of this invention will be readily apparent to those skilled in the art. Various changes in detail may be made without departing from the spirit or losing the advantage of the invention.

Having thus described the invention, what is claimed as new and desired to secure by Letters Patent is:

1. A battery testing adapter comprising:
   an elongated conducting stem having threads at one end;
   a conducting base portion secured to the other end of said stem and having a tapered axial bore adapted to receive and make electrical contact with a battery terminal;
   a first insulating washer on said stem adjacent said base portion;
   a conducting elongated sleeve member on said stem adjacent said first insulating washer, the end portion of said sleeve member adjacent said first insulating washer reduced in diameter and threaded, the opposite end portion tapered and adapted to receive a cable clamp;
   an insulating tube between said conducting sleeve member and said stem;
   a first conducting washer on said sleeve member between the said end portions thereof, said washer electrically connected to said sleeve member;
   a second conducting washer on said sleeve member between and spaced from said first conducting washer and said first insulating washer, said second conducting washer insulated from said sleeve member;
   resistance means connected between said first and second conducting washers;
   a nut on the threaded end portion of said sleeve member; and
   a conducting nut on the threads of said conducting stem, said nut during use of the adapter selectively engaged with and disengaged from the tapered end portion of said sleeve member.

2. A battery testing adapter comprising:
   an elongated conducting stem having threads at one end;
   a conducting base portion secured to the other end of said stem and having a tapered axial bore adapted to receive and make electrical contact with a battery terminal;
   a conducting elongated sleeve member on said stem, the end portion of said sleeve member remote from said base portion tapered and adapted to receive a cable clamp normally connected to the battery terminal;
   means insulating said sleeve member from said stem and said base portion;
   a spaced pair of conducting washers mounted on said sleeve member, one of said washers insulated from said sleeve member and the other in conducting relation therewith;
   resistance means connected between said conducting washers; and
   a conducting nut on the threads of said conducting stem, said nut during use of the adapter selectively engaged with and disengaged from the tapered end portion of said sleeve member.

3. A battery testing adapter comprising:
   a conducting stem having threads at one end;
   a conducting base portion secured to the other end of said stem, said base portion adapted to connect electrically with a battery terminal;
   a conducting sleeve member on said stem, said sleeve member adapted for connection with a battery cable normally connected to the battery terminal;
   means insulating said sleeve member from said stem and said base portion;
   a spaced pair of terminal elements mounted on said sleeve member, one of said terminal elements insulated from said sleeve member and the other in conducting relation therewith;
   resistance means connected between said terminal elements; and
   a conducting nut on the threads of said conducting stem, said nut during use of the adapter selectively engaged with and disengaged from said sleeve member.

4. A battery testing adapter comprising:
   a conducting stem;
   means adapted to connect said stem electrically to a battery terminal;
   a conducting sleeve member on said stem, said sleeve member adapted for connection with a battery cable normally connected to the battery terminal;
   means insulating said sleeve member from said stem;
   a spaced pair of terminal elements on said sleeve member, one of said terminal elements insulated from said sleeve member and the other in conducting relation therewith;
   resistance means connected between said terminal elements; and
   switch means selectively electrically connecting and disconnecting said sleeve member with respect to said stem.

5. An in-place automobile battery testing adapter comprising:
   conducting stem means for connecting a voltmeter to a battery terminal;
   conducting means including said stem means and a conducting connecting means on and insulated from said stem means for connecting an ammeter in series circuit with said battery terminal and a battery cable normally connected thereto, said connecting means adapted to receive and connect electrically with said battery cable;

means selectively introducing resistance in said series circuit to simulate a charged battery; and switch means selectively by-passing the ammeter portion of said series circuit by selectively connecting said stem means to said connecting means whereby starter current may flow in circuit with said battery terminal and said battery cable without traversing said ammeter connected therebetween.

6. The combination of claim 5 wherein said enumerated component means are substantially in-line with each other and co-linear with said battery terminal, whereby strain on the battery terminal is minimized.

References Cited

UNITED STATES PATENTS

| | | | |
|---|---|---|---|
| 2,640,118 | 5/1953 | Werner | 200—51.1 X |
| 2,721,917 | 10/1955 | Duerkob | 338—215 X |
| 3,166,650 | 1/1965 | Heidrich | 200—162 |

BERNARD A. GILHEANY, *Primary Examiner.*

H. A. LEWITTER, *Assistant Examiner.*